US006867774B1

(12) United States Patent
Halmshaw et al.

(10) Patent No.: US 6,867,774 B1
(45) Date of Patent: Mar. 15, 2005

(54) METHOD AND APPARATUS FOR TRANSFORMING POLYGON DATA TO VOXEL DATA FOR GENERAL PURPOSE APPLICATIONS

(75) Inventors: Paul A. Halmshaw, Vancouver (CA); Jonathan M. Young, Vancouver (CA); Andrew C.-H. Woo, Vancouver (CA)

(73) Assignee: NGRAIN (Canada) Corporation, Vancouver (CA)

( * ) Notice: Subject to any disclaimer, the term of this patent is extended or adjusted under 35 U.S.C. 154(b) by 302 days.

(21) Appl. No.: 10/309,412

(22) Filed: Dec. 2, 2002

(51) Int. Cl.[7] .............................................. G06T 15/00
(52) U.S. Cl. ..................................................... 345/424
(58) Field of Search ................................ 345/419, 424, 345/428, 581, 6; 382/154

(56) References Cited

U.S. PATENT DOCUMENTS

| | | | | |
|---|---|---|---|---|
| 6,377,229 B1 | * | 4/2002 | Sullivan | 345/6 |
| 6,690,820 B2 | * | 2/2004 | Lees et al. | 382/154 |
| 6,806,849 B2 | * | 10/2004 | Sullivan | 345/6 |

OTHER PUBLICATIONS

Kaufman, Efficient Algorithms for 3D Scan–Conversion of Parametric Curves, Surfaces, and Volumes, ACM Computer Graphics, vol. 21, No. 4, Jul. 1987,pp. 171–179.*
Wang et al., Volume Sampled Voxelization of Geometric Primitives; IEEE, Oct. 1993, pp. 78–85.*
Blinn, J.F., "Simulation of Wrinkled Surfaces," Caltech/JPL, pp. 286–292, Aug. 1978.
Lichtenbelt, B. et al., "Introduction to Volume Rendering," HP Professional Books, Jun. 1998, pp. 69–74.
Pfister, M. et al., "Surfels: Surface Elements as Rendering Primitives," Siggraph, http://www.merl.com/people/pfister/pubs/sig2000.pdf. Jul. 2000, pp. 335–342.
Westerman, R. et al., "Decoupling Polygon Rendering from Geometry using Rasterization Hardware," Proceedings of the Tenth Eurographics Workshop on Rendering, Universität Erlangen–Nürnberg, Germany, Jun. 1999, http://wwwvls.informatik.uni–stuttgart.de/~sommer/Public/papers/EGWoR1999..ps.gz, pp. 1–13.

Woo, A. et al., "It is really not a Rendering Bug, You See . . . ," IEEE Computer Graphics and Applications, Sep. 1996, pp. 21–25, http://www.aliaswavefrong.com/en/companyinfo/research/papers/pdf/IEEEbug.pdf.

Herman, H., "Robotic Subsurface Mapping Using Ground Penetrating Radar," The Robotics Institute, Carnegie Mellon University, Pittsburgh, Pennsylvania, May 1997, pp. 73–77.

Möller, Torsten, et al., "A Comparison of Normal Estimation Schemes," Department of Computer and Information Science, The Advanced Computing Center for the Arts and Design, The Ohio State University, Columbus, Ohio; and NSF Engineering Research Center for Computational Field Simulation, Department of Computer Science, Mississippi State University, Mississippi, Aug. 1997, pp. 19–26.

Brejl, M., and M. Sonka, "Directional 3D Edge Detection in Anisotropic Data: Detector Design and Performance Assessment," *Special Issue of Computer Vision and Image Understanding on Analysis of Volumetric Images,* accepted in May 1999, pp. 1–23 <http://www.engineering.uiowa.edu/~ceig/Brejl/link /research/Projects/3DedgeDetect/3DedgeDectection.html>.

* cited by examiner

*Primary Examiner*—Phu K. Nguyen
(74) *Attorney, Agent, or Firm*—Christensen O'Connor Johnson Kindness PLLC

(57) ABSTRACT

A method and apparatus are provided for transforming 3D geometric data, such as polygon data (16) formed of polygons (18), into volumetric data (14) formed of voxels (12). According to the method, 3D geometric data to be converted to voxel data are acquired, and the resolution of a final voxel grid to be produced is obtained (e.g., user-defined). Then, each geometric unit (e.g., a polygon) in the 3D geometric data is mapped (or scan converted) to an imaginary voxel grid having a higher resolution than the resolution of the final voxel grid. Next, with respect to the geometric units that are mapped to the imaginary voxels in the imaginary voxel grid dividing one final (actual) voxel into smaller sub-volumes, a weighted average of the attribute values (color, normal, intensity, etc.) is obtained. The weighted average is stored as the attribute value of the final voxel.

38 Claims, 13 Drawing Sheets

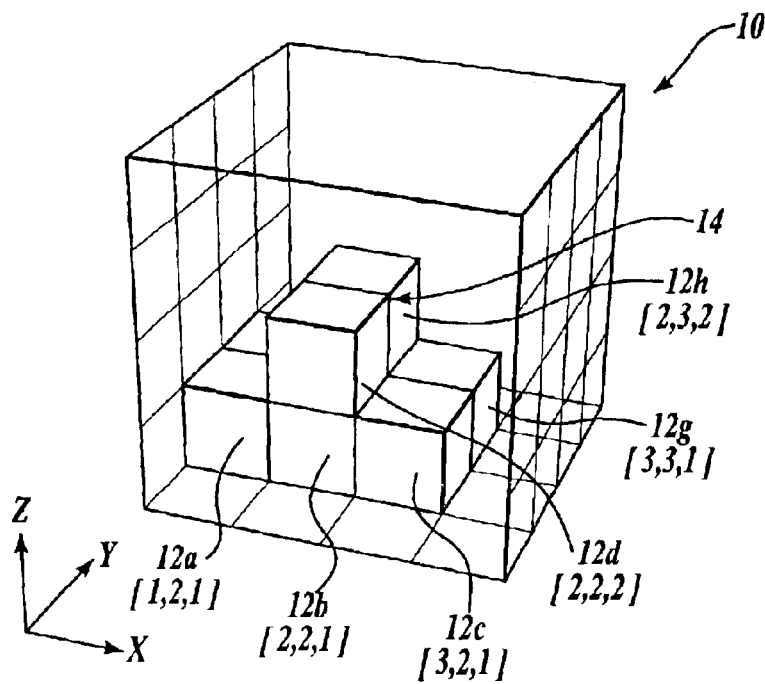
Fig.1.
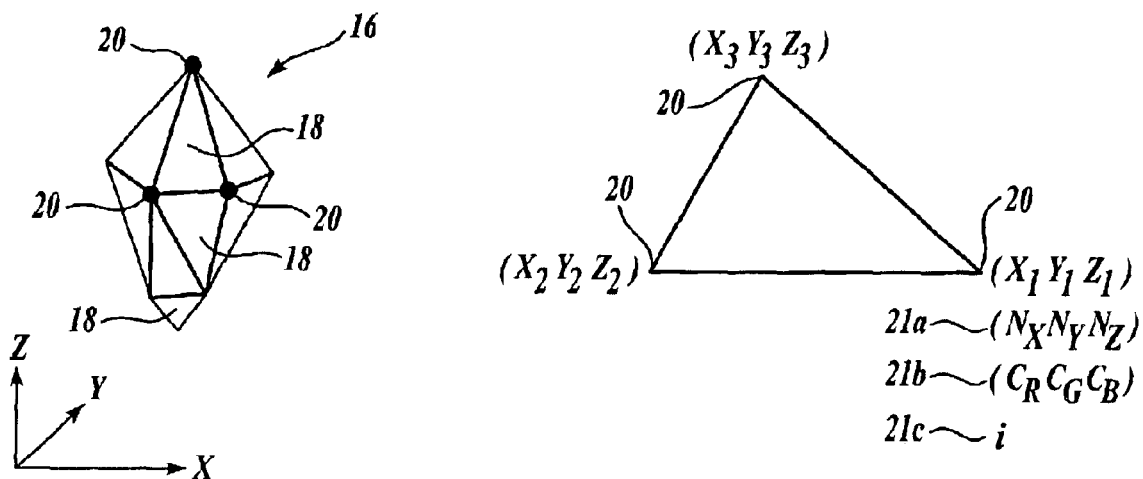
Fig.2A. Fig.2B.

*Fig.11.*
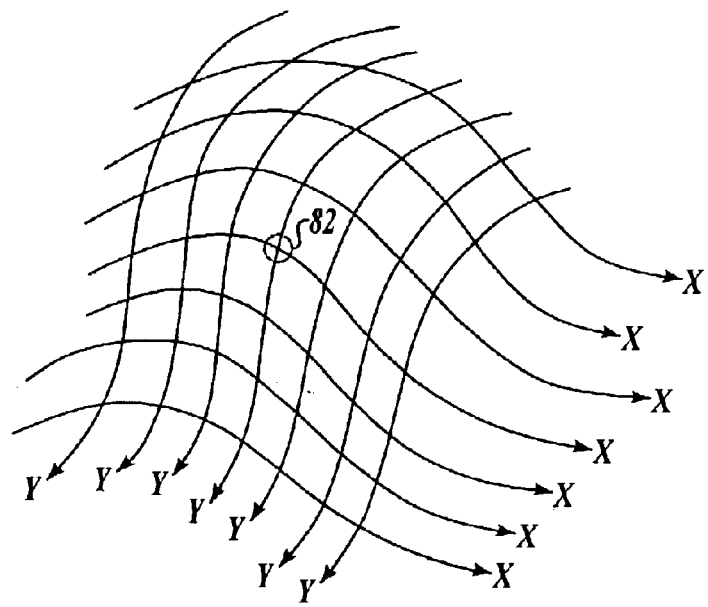
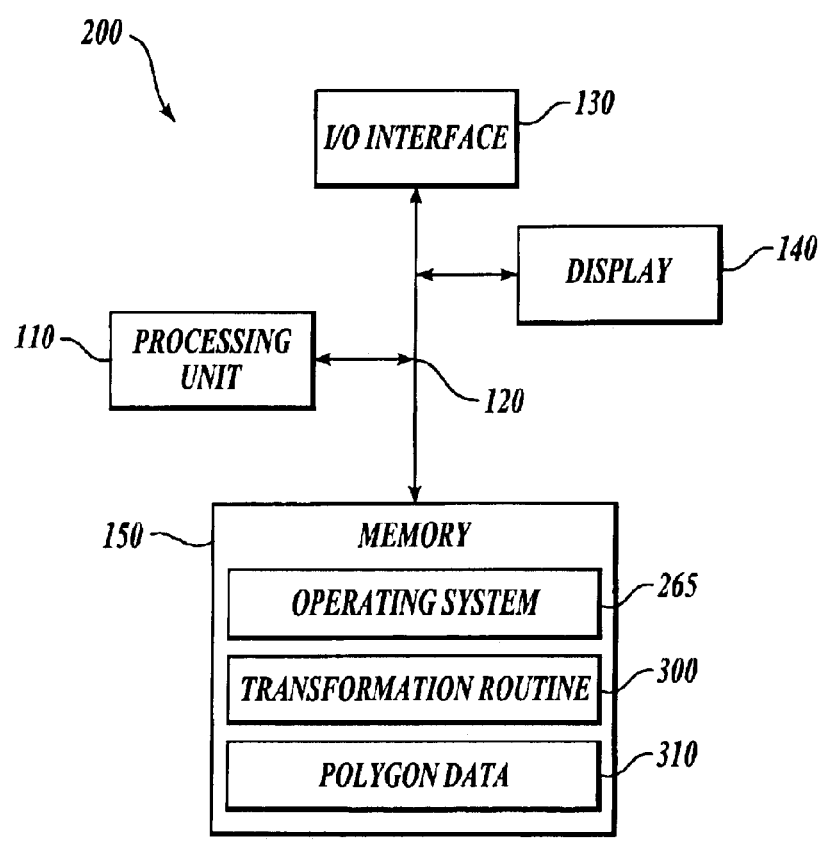
*Fig.12.*

METHOD AND APPARATUS FOR TRANSFORMING POLYGON DATA TO VOXEL DATA FOR GENERAL PURPOSE APPLICATIONS

FIELD OF THE INVENTION

The present invention relates generally to three-dimensional (3D) computer graphics, and more particularly to transforming polygon-based 3D data to volumetric data (voxels) for general purpose applications.

BACKGROUND OF THE INVENTION

Three dimensional (3D) computer graphics have become an important part of business today. Almost everyone who uses computers to communicate can appreciate the benefits of using 3D visualization and simulation technologies for data modeling, which can be applied in marketing materials, educational materials, training materials, etc. However, there are some barriers to overcome before everyone, i.e., a user with a standard personal computer (PC), can enjoy these benefits.

For example, as 3D computer models grow more sophisticated, the hardware needed to display them is constantly being pushed to capacity. Typically, in order to enjoy 3D graphics with both high interactivity and realism, a user needs to use special hardware to meet the added computational loads.

To meet this challenge, the assignee of the present application has developed a unique 3D software framework and real-time volume graphics engine called NGRAIN™ (available from i3Dimensions, Inc. of British Columbia, Canada). The software framework provides the infrastructure to assemble and manage a digital world, and offers the ability to create objects in that world. The graphics engine enables dynamic update and display of 3D image attributes and is designed to operate on common PCs without requiring specialized graphics acceleration hardware.

NGRAIN™ assembles and manages 3D images based on volume graphics. Volume graphics represent 3D objects using volume elements called "voxels." A voxel is a 3D pixel, i.e., a pixel that has a third coordinate z in addition to x and y coordinates. FIG. 1 shows an example of a 4×4×4 volume (or voxel grid) 10 containing 64 possible locations. Eight of these locations contain voxels 12a–12h at [1,2,1], [2,2,1], [3,2,1][2,2,2], [1,3,1], [2,3,1], [3,3,1], and [2,3,2], respectively, which collectively form a 3D object 14. The data structure of NGRAIN™ is based on volume graphics, and together with its image rendering techniques, are described in detail in commonly owned Patent Cooperation Treaty Applications: Serial No. PCT/CA00/01010 (Publication No. WO 02/07088A2); PCT/CA01/00997 (Publication No. WO 02/07089A2); and PCT/CA/01/00686 (Publication No. WO 02/07097A1), which are incorporated herein by reference.

Volume graphics are commonly used in special purpose applications, such as in medical imaging based on CT or MRI scans and in engineering imaging, which require detailed visualization of internal characteristics/structure of an object. These special purpose applications, however, involve intensive processing of voxels to create or manipulate an image, which in turn may require special-purpose hardware for accelerated rendering. Further, these special purpose applications typically do not concern themselves with many polygonal techniques, such as color texture or bump mapping, since the main purpose of these applications is generally to visualize the structural/geometrical information of an object NGRAIN™, on the other hand, is a general purpose application that achieves realistic and interactive visualization of an object that takes those polygonal techniques into account and applies them to a full range of attributes (color, intensity, normal, etc.), based on volume graphics, without requiring special hardware.

Volume graphics allow for achieving the degree of realism required for high quality simulations and visualization applications because volume models can contain both surface and internal characteristics of a real object. This is contrary to surface-based graphics, such as polygonal graphics which utilize a plurality of flat surfaces called "polygons", typically triangles, to represent the surfaces of an 3D object. FIG. 2A hows an example of a polygon mesh object 16, which is formed of a plurality of triangle polygons 18, (8 polygons are visible in FIG. 2A.) Each polygon is defined by its vertices 20 in the 3D Cartesian (xyz) coordinate system. Specifically, referring to FIG. 2B, each polygon is defined by its vertices 20, and each vertex 20 is typically associated with a set of attribute values such as a normal 21a, a color value 21b, and intensity 21c. A normal is a unit vector that is perpendicular to a surface at a designated point, and is used during image rendering to apply appropriate lighting to an object being rendered. A color value, or "rgb" (red, green, blue) value, is an 8-bit value from which the range of colors that can be displayed by a rendering system are generated. Intensity refers to the brightness or darkness of an object at a particular point. Note that the polygon mesh object 16 is hollow inside, i.e., there is no information concerning the internal structure/characteristics of the object 16, unlike in the case of volume graphics described above. Also, rendering of a high quality polygon mesh to approximate a curved surface usually consists of processing numerous polygons of various shapes and sizes, and thus is computationally intensive.

Despite these disadvantages, polygon mesh data are widely created and used today, as most 3D modeling software generate polygon mesh data These polygon mesh data in their present form, however, cannot be processed using NGRAIN™. To permit a user to enjoy the power of NGRAIN™, i.e., to achieve highly realistic and interactive simulation and visualization of 3D objects on a standard PC, the 3D objects that currently exist in polygon format need to be converted to voxels processable by NGRAIN™. Therefore, a need exists for a method and apparatus for efficiently converting polygon mesh data to voxels. Further, the method and apparatus should transfer any attribute data, such as color, intensity, and normal, from each polygon to the corresponding voxel because NGRAIN™ is a general-purpose application of volume graphics that requires these attribute data for rendering purposes.

SUMMARY OF THE INVENTION

To satisfy the need described above, the present invention offers a method and apparatus for efficiently transforming 3D geometric data to voxel data. The method includes generally five steps. First, 3D geometric data, such as polygon-based 3D data, are obtained. Then, the resolution of a final voxel grid to be produced is obtained (e.g., user-defined and user-guided.) Thereafter, each geometric unit in the 3D geometric data, for example a polygon in the case of the polygon-based 3D data, is mapped (or scan converted) to an imaginary voxel grid having a higher resolution than the resolution of the final voxel grid. Next, with respect to the geometric units (e.g., polygons) that are mapped to the imaginary voxels in the imaginary voxel grid, dividing one (actual) voxel into smaller sub-volumes, a weighted average of the attribute values (color, normal, or intensity, etc.) of those geometric units as they intersect or are contained by the imaginary voxels is obtained. Finally, the weighted average is stored as the attribute value of the final voxel.

According to the sampling method described above, the attributes of each geometric unit (e.g., polygon) that is scan converted into a single voxel contribute proportionally to the final attribute of the voxel so that the voxel's attribute more accurately reflects the attributes of the original geometric unit(s). Further, the present sampling method is advantageous in that it does not require actual memory storage space for the high-resolution voxel grid since the high-resolution voxel grid is merely imaginary. The method may be used in transforming any 3D geometric data, such as polygon data and b-spline data, into voxel data.

In accordance with one aspect of the present invention, a special sub-function is provided to obtain a weighted average of a plurality of normals (normal vectors) for a final voxel, using the sampling method described above. The sub-function adds each normal value to a total normal value according to the criteria that the total normal magnitude can only grow. In a specific embodiment, this is achieved by determining if addition of a normal value to the total normal value will cause the magnitude of the total normal value to grow, and if not by changing the direction of the normal value by 180 degrees.

In accordance with another aspect of the present invention, a method and apparatus are provided for transforming surface-based 3D data (e.g., polygon data and b-spline surfaces data) to voxel data, while "encoding" a texture map (or any other "attribute" map) into the voxel data, to in effect replace and represent the texture map. The method generally includes five steps. First, surface-based 3D data are acquired. Then, a texture map associated with the surface-based 3D data is obtained. Thereafter, each surface unit (e.g., a polygon) in the surface-based 3D data is mapped (scan converted) to a voxel grid. Next, for each voxel in the voxel grid mapped from the surface unit, a color value is obtained by interpolating the surface unit's vertex texture coordinates and then performing a lookup of the interpolated coordinate in, the texture map. Finally, the color value obtained from the texture map for each voxel is stored. Thus, the color values of the voxel set effectively represent and replace the texture map.

Replacing a texture map with the color values of voxel data, or "encoding" a texture map into the voxel data, as described above, is highly advantageous because it eliminates the need to carry a RAM-intensive texture map around in association with voxel data, let alone the need for constant interpolation and lookup of a texture map during image rendering. The present method may be readily applied in replacing other types of attribute maps used in 3D graphics. For example, a bump map that is used to provide information about the imaginary height of an image can be "encoded" into the normal values of voxels, in the same manner as how the texture map is encoded into the color values of voxels.

In accordance with a further aspect of the present invention, a method is provided to transform surface-based 3D data to voxel data for the purpose of "complexity decimation," i.e., progressive reduction in data complexity. The method includes generally three steps. First, surface-based 3D data, such as polygon-based 3D data, are acquired. Next, the resolution of an intended display is obtained.

Lastly, each surface unit (e.g., a polygon) in the surface-based 3D data is mapped to a voxel grid having a resolution corresponding to the resolution of the intended display. For example, the resolution of a voxel grid is recommended to be set at 0.5 to 2 of the resolution of an intended display device. Thus, for a low-resolution display, the surface-based 3D data are aggressively reduced in complexity, while for a high-resolution display, the same data are moderately reduced in complexity, and yet in both cases the resulting voxel data are sufficient to render an image of high enough quality.

There has been literature on polygonal complexity decimation (i.e., how to reduce complexity within polygonal data). However, polygonal complexity decimation suffers from the following problems, which complexity decimation in voxel space would not: the unpredictability of how smooth the curves will look after the polygonal decimation; the gaps between joined surfaces; texture warping problems; unpredictable shadow problems at the silhouette of lit regions, etc. See *A. Woo, M. Ouellette, A. Pearce,* "It is really not a Rendering bug, you see . . . ", IEEE Computer Graphics and Applications, September 1996, pp. 21–25. Reliable complexity decimation is possible during the conversion of surface-based 3D data to voxel data due to the data structure of voxels. Because all voxels are equally shaped, sized, and evenly spaced from each other, progressive reduction of complexity can be reliably achieved by adjusting the resolution of a final voxel grid into which the surface-based 3D data are to be translated.

In accordance with a further aspect of the present invention, a novel method of generating a normal for a voxel is provided, which may be used to repair a "bad" normal obtained from the sampling method described above, or to generate a normal when no normal data are available in the original 3D data that are to be converted to voxel data The method includes generally four steps. First, a scan plane is projected to intersect a voxel, for which a normal is to be generated. The scan plane is perpendicular to a first axis (e.g., the x axis). Next, using the scan plane, scanning is performed for voxels in the direction perpendicular to the scan plane. Then, the traversed distance before a voxel was found for each voxel space in the scan plane is recorded. Finally, based on the recorded data, a normal ($N_1$, $N_2$, $N_3$) of the voxel is obtained, wherein $N_1$ is the first component of the normal along the first axis (e.g., the x component), $N_2$ is the second component of the normal along the second axis perpendicular to the first axis (e.g., the y component), and $N_3$ is the third component of the normal perpendicular to both the first and second axes (e.g., the z component). Specifically, according to the present invention, $N_1$ is set as 1. $N_2$ is obtained by adding incremental changes between the traversed distances recorded in each adjacent voxel spaces along the second axis (e.g., the y axis) and dividing the total incremental changes by the number of voxel spaces. Similarly, $N_3$ is obtained by adding incremental changes between the traversed distances recorded in each adjacent voxel spaces along the third axis (e.g., the z axis) and dividing the total incremental changes by the number of voxel spaces.

Multiple scan planes may be used to calculate multiple normals for the voxel in question. Also, each scan plane may be scanned in both positive and negative directions along its axis to calculate two normals per scan plane. The multiple normals may then be averaged to obtain an average normal for the voxel in question. Alternatively, each normal may be rated for its reliability based on the number of discontinuities (i.e., changes having a gradient greater than a predefined value) found in the data set that produced the normal, and the normal associated with the smallest number of discontinuities may be selected as the most reliable normal for the voxel in question.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a schematic representation of 3D data based on volume graphics;

FIG. 2A is a schematic representation of 3D data based on polygonal graphics;

FIG. 2B is a schematic representation of definition of a polygon;

FIG. 11 is a pictorial diagram illustrating the pattern of surface behavior of the region surrounding the voxel for which a normal is to be calculated; and FIG. 12 is a block diagram of several components of a computing device that may be used to transform polygon mesh data into voxel data, according to the present invention.

DETAILED DESCRIPTION OF THE PREFERRED EMBODIMENT

As will be appreciated by those skilled in the art, all of the methods described hereinbelow may be readily used to convert any surface-based graphics (higher order surfaces), not limited to polygon-based graphics, into voxel graphics. Therefore, although the following describes the conversion of polygon-based 3D data to voxels, it should be understood that the methods of the present invention may be used to convert other types of surface-based graphics, such as b-spline surface data (e.g., NURBS), into voxel data. Further, some of the methods are applicable in converting any 3D geometric representations into voxel data, as will be elaborated below.

Sampling Method

Figure 3A:
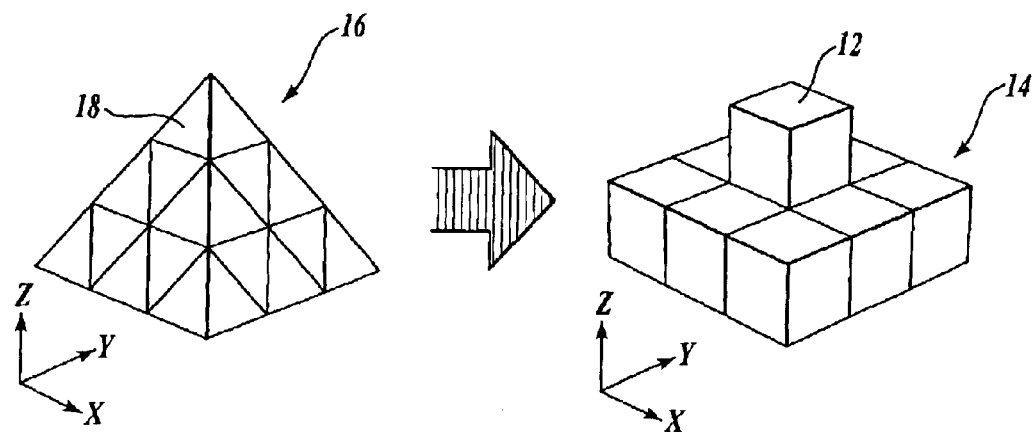
FIG. 3A is a pictorial diagram illustrating the transformation of polygon mesh data into voxel data.

FIG. 3A schematically illustrates the conversion of a polygon-based 3D object 16 formed of polygons 18 into a voxel-based object 14 formed of voxels 12. To this end, each polygon 18 is converted into one or more voxels. As illustrated, both a polygon-based 3D object and a voxel-based object are defined in their respective Cartesian coordinate systems, and the positional translation between a polygon and one or more voxels is performed between these two Cartesian coordinate systems. Some examples of the algorithm used to affect such positional translation are described in the commonly-owned, co-pending U.S. patent application Ser. No. 10/309,411, entitled "METHOD AND APPARATUS FOR TRANSFORMING POINT CLOUD DATA TO VOLUMETRIC DATA," filed Dec. 2, 2002 incorporated by reference herein, and also in other references such as A. Kaufinan, E. Shimony, "3D scan-conversion algorithms for voxel-based graphics," Symposium on 3D Interactive Techniques, 1987. As schematically illustrated in FIG. 3B, the conversion function needs to map (or "scan convert") each polygon 18 to the Cartesian coordinate system of the voxel environment to find one or more voxels 12 that the polygon will occupy.

To achieve a good result of conversion, an adequate number of voxels relative to display device resolution should be used to represent polygons; otherwise the converted model will have jagged edges. In general, a voxel grid resolution is set at 0.5 to 2 of the resolution of an intended display device, as will be more fully discussed below. For example, if an intended display has a resolution of 640×480, the voxel grid resolution should be set within the range of $320^3$ to $1280^3$. Note that the voxel grid resolutions do not need to be the same in all of the x,y,z axes—such aspect ratio relationship would be model specific.

As discussed in the background section above, a polygon is a typical 3D object representation defined by its vertices' coordinates, and each polygon vertex typically contains a vertex normal (and perhaps texture coordinates and tangent values). Each vertex can also be associated with a set of further attribute values such as a color value, intensity, etc. (see FIG. 2B). For each type of attribute values, the attribute value at any point on the polygon may be averaged (obtained) using some combination function of the polygon vertices (examples of such function are described in the commonly-owned, co-pending U.S. patent application Ser. No. 10/309,411, entitled "METHOD AND APPARATUS FOR TRANSFORMING POINT CLOUD DATA TO VOLUMETRIC DATA," incorporated above). For example, a single color value, normal, intensity, etc. can be calculated for any point on the polygon by first computing some weighted contribution from the polygon vertices (a typical implementation of this applies barycentric coordinates), then using this weight to arrive at a weighted average of the vertices' attribute values for this point. Alternatively, depending on the type of particular polygon data, a polygon may include a pointer referring to a single set of attribute values for that polygon. For example, color is typically not stored per vertex, but an entire polygon set points to a single color, or a color texture map (the indices to access a particular portion of the texture map are stored per polygon vertex in the form of (s, t) texture coordinates).

Figure 3B:
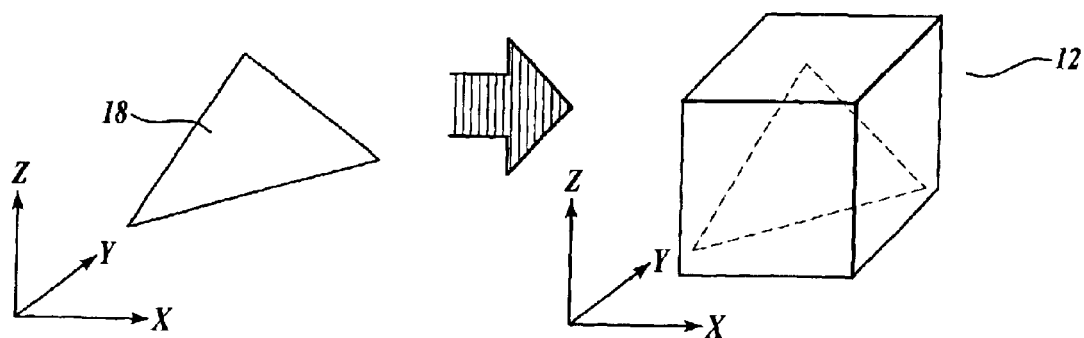
FIG. 3B schematically illustrates the geometric (positional) translation of a polygon into a voxel.
Figure 4A:
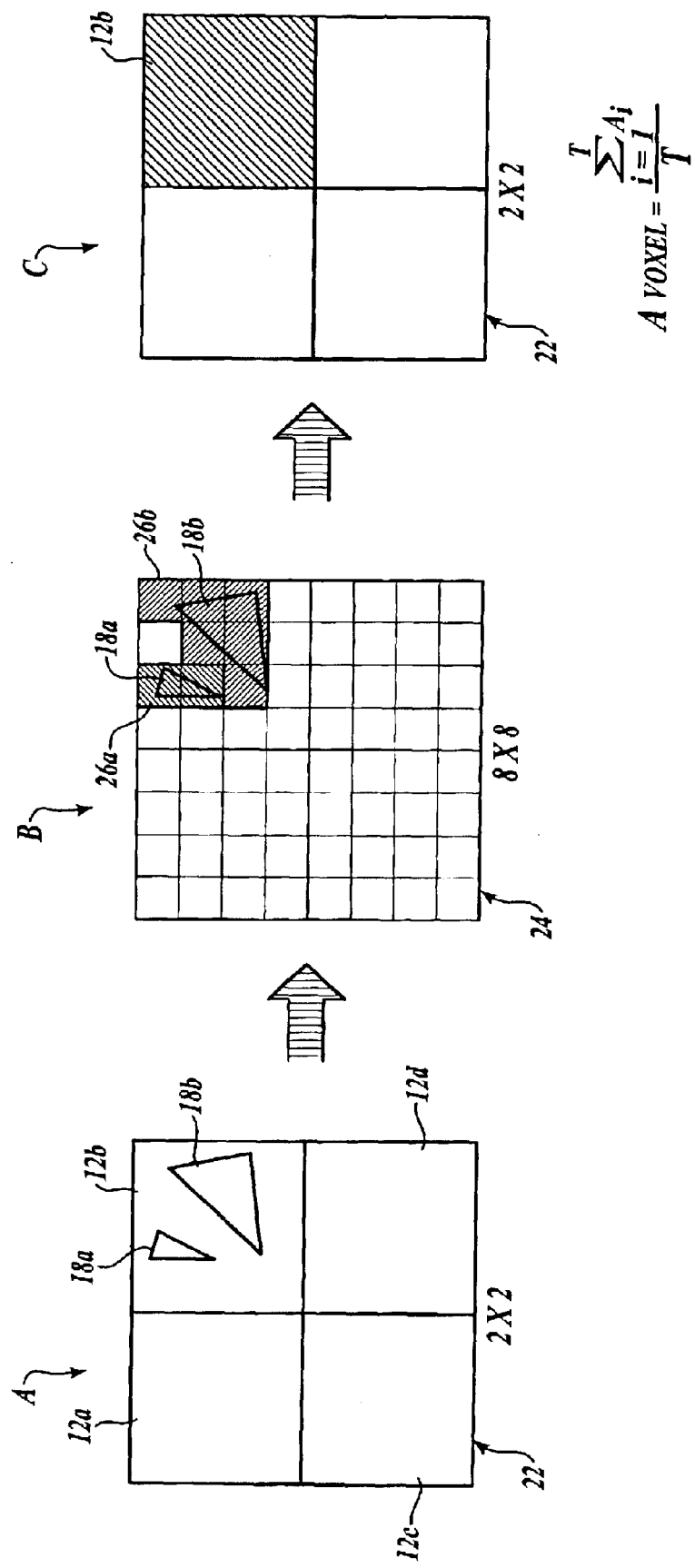
FIG. 4A schematically illustrates a sampling method used in the polygon-to-voxel conversion according to the present invention, using an imaginary high-resolution voxel grid.

When converting a polygon into one voxel, as shown in FIG. 3B, any attribute values associated with a polygon (color, normal, intensity, etc.) contribute to the average attribute values of the resulting voxel intersecting the polygon. Any resulting voxel contains one or more polygons. Referring to FIG. 4A, "A" points to a schematic representation of this situation, wherein two polygons 18a and 18b are scan converted into one voxel 12b in the 2×2 voxel grid 22 containing four voxels (12a–12d). For ease of illustration, the polygons 18a, 18b and the voxels 12a–12d are illustrated in 2D in FIG. 4A, though the actual polygons and voxels are 3D, as will be apparent to those skilled in the art. In FIG. 4A, the polygon 18b is much larger than the polygon 18a. Thus, simply importing the attributes of the polygons 18a and 18b to the voxel 12b, without considering the relative sizes of the polygons 18a and 18b, would result in the voxel 12b having rather distorted attribute values with too much contribution from the smaller polygon 18a and not enough contribution from the larger polygon 18b.

To mitigate this problem, referring to FIG. 4A, "B", in accordance with the present invention, the conversion function is instructed to translate each polygon (18a, 18b) into an "imaginary" voxel grid 24 of higher resolution (8×8 in the entire imaginary voxel grid, or 4×4 per actual voxel in the illustrated embodiment) than the resolution (2×2) of the actual voxel grid 22. The "imaginary" voxel grid does not require any additional memory compared to the case where no "imaginary" voxel grid exists and voxel memory only exists for the actual voxel grid 22. In the illustrated example, the smaller polygon 18a thus translates into two "imaginary" voxels 26a, and the larger polygon 18b translates into six "imaginary" voxels 26b. This way, assuming that each polygon is associated with a single attribute value for the ease of illustration, an attribute value of the smaller polygon 18a is registered twice (once per "imaginary" voxel), while an attribute value of the larger polygon 18b is registered six times. Then, a weighted average of all the registered attribute values is calculated and stored as the attribute value for the corresponding actual voxel 12b in the 2×2 voxel grid 22, as indicated in FIG. 4A, "C". The weighted average is calculated as follows:

$$A_{voxel} = \frac{\sum_{i=1}^{T} Ai}{T}$$

wherein A is an attribute value (color, intensity, normal, etc.), and T is the total number of "imaginary" voxels dividing one actual voxel into smaller sub-volumes. In one embodiment, instead, a contribution weight Wi can be multiplied to each contribution $A_i$ to reflect each contribution in the final average, according to the following equation:

$$A_{voxel} = \frac{\sum_{i=1}^{T} (Wi)(Ai)}{T}$$

For example, the weight Wi may be larger for Ai if it resides closer to the center of the voxel, and smaller if it resides near the corner of the voxel, perhaps using Gaussian weighting function.

Figure 4B:
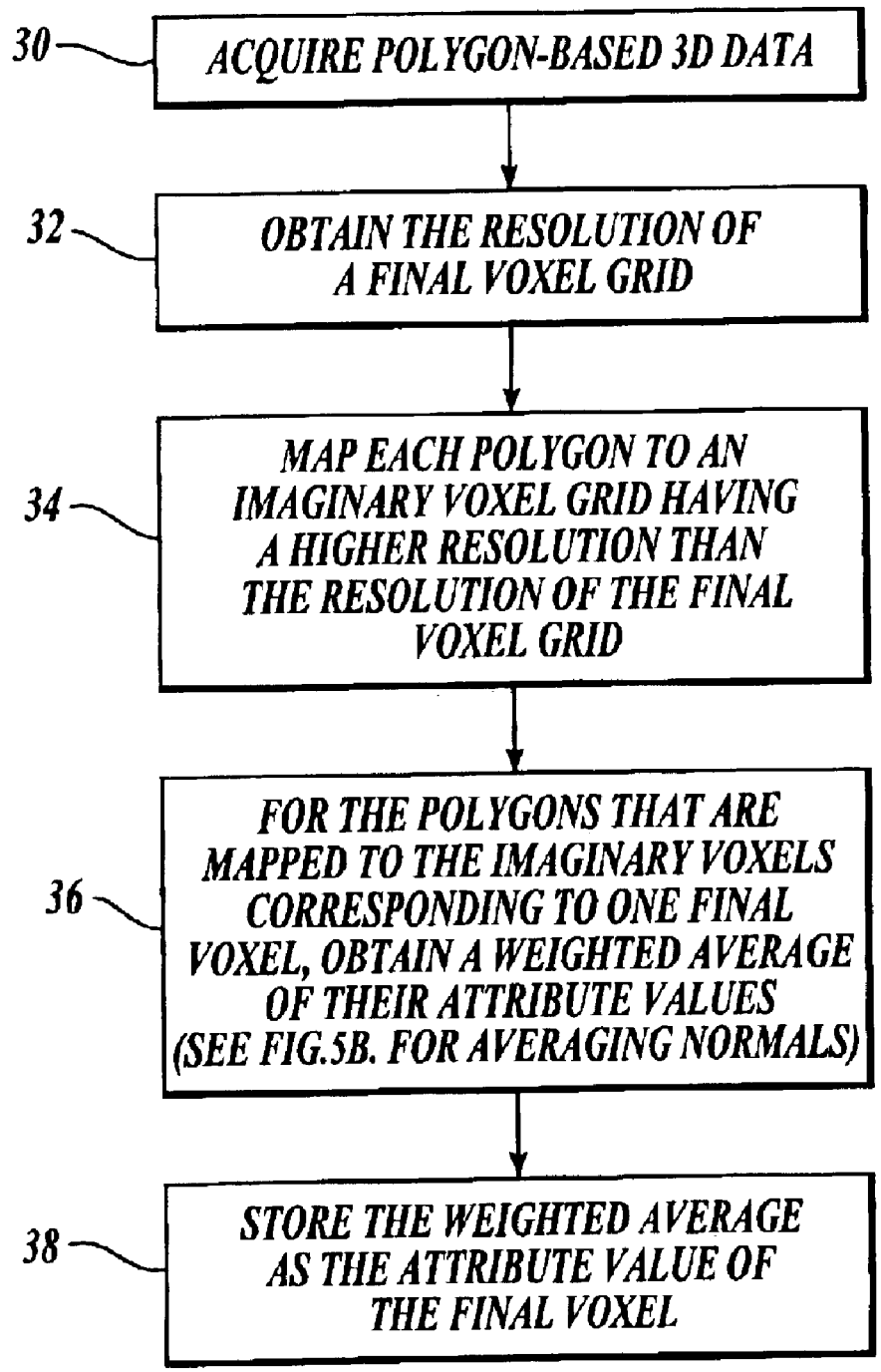
FIG. 4B is a flowchart illustrating the steps used in the sampling method of FIG. 4A.

FIG. 4B is a flowchart illustrating the steps performed by the conversion function to affect the sampling method described above in reference to FIG. 4A. In step 30, polygon-based 3D data are acquired. In step 32, the resolution of an actual (final) voxel grid is obtained (this may be user-inputted or user-guided, and in the example above, the voxel resolution would be 2×2). In step 34, each polygon in the polygon-based 3D data is mapped (or "scan-converted") to an imaginary voxel grid having a higher resolution than the resolution of the actual voxel grid and dividing the actual voxel grid into smaller sub-volumes. (See FIG. 4A, "B".) In step 36, with respect to all the polygons that are mapped to the imaginary voxels corresponding to one actual voxel, a weighted average of the attribute values of those polygons is obtained as they intersect or are contained by the imaginary voxels. When averaging normals, a special sub-function may be used, as will be described in detail below in reference to FIGS. 5A and 5B. Finally, in step 38, the weighted average for the actual voxel obtained from the contributions of the imaginary sub-volumes is stored as the attribute value for the actual voxel.

In the above discussion, it was assumed that each polygon (polygons 18a and 18b) has one set of attribute values (color, normal, intensity, etc.). For example, referring to FIG. 4A, "B", the polygon 18b was assumed to have one color value, which was registered six times at the six imaginary voxels 26b. It should be understood by those skilled in the art that other calculation methods may also be used in the sampling method according to the present invention. For example, instead of using a single color value for the entire polygon 18b, a separate color value for each imaginary voxel 26b may be calculated using interpolation based on the color values of the three vertices of the polygon 18b, and then these separate color values may be averaged together to produce a weighted average for the final voxel.

According to the present sampling method, the attributes of each polygon that translate into a single voxel are proportionally contributed to the final attribute of the voxel so that the voxel's attribute more accurately reflects the attributes of the original polygons. Further, the present sampling method is advantageous in that it does not require actual memory storage space for the high-resolution voxel grid since the high-resolution voxel grid is merely imaginary. Yet, by using the high-resolution imaginary voxel grid, the method permits more accurate computation of attribute values for final voxels in the low-resolution actual voxel grid. It has been found that the resolution of an imaginary voxel grid is preferably set at 3–7 times the resolution of the actual voxel grid to obtain good results, though other ranges of resolutions, particularly higher ones, may also work depending on a specific application.

The sampling method of the present invention can be used for converting various attribute values associated with polygons into the attribute values for voxels that accurately reflect the original attributes. The attribute values may include, but not limited to, color, intensity, normal, temperature, density, mass, tensile strength, and flammability values, and may in fact be any value that a user may define in association with the original polygon data in one form or another (i.e., it does not need to reside with the vertices, but may be stored as some form of texture map). The sampling method can be carried out for each type of plural attribute values to produce a full set of attribute values for each of the actual voxels. Then, each type of attribute values for the actual voxels may be stored in a separate array.

The sampling method of the present invention is not only applicable to polygons, but also practically to any 3D geometric data representations that can be scan converted, including constructive solid geometry (CSG) and surface based representations such as b-splines and subdivision surfaces. For example, after the b-spline is mapped (scan converted) into the imaginary voxels, the same weighting method can be performed to obtain attribute values for the actual voxel set.

Averaging Normals

The sampling method described above may be used to obtain a normal for a final voxel, by calculating a weighted average of a plurality of normals registered at high-resolution imaginary voxels. The present invention further offers a special sub-function to be used in averaging normals.

Figure 5A:
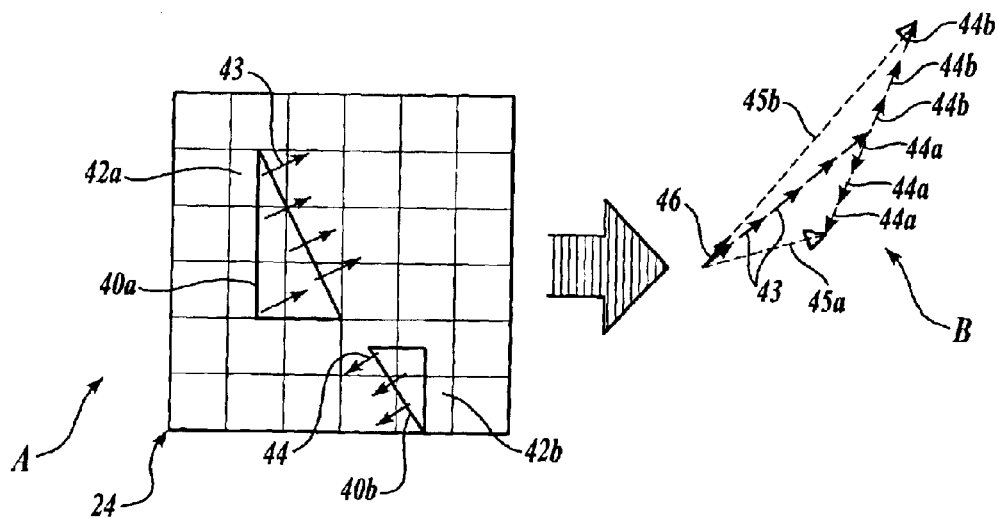
FIG. 5A schematically illustrates a method of averaging normals according to the present invention, selectively negating certain normals with the criteria that the total normal magnitude can only grow.

Referring to FIG. 5A, "A," an imaginary voxel grid 24 corresponding to one actual voxel contains two polygons 40a and 40b, which occupy five imaginary voxels 42a and three imaginary voxels 42b, respectively. In the illustrated example, each polygon is associated with one normal vector; the polygon 40a has a normal vector 43 and the polygon 40b has a normal vector 44., To obtain a weighted average of these normal vectors, referring to FIG. 5A, "B," the normal vectors need to be added together. According to the present invention, for each normal vector that is to be added, if the magnitude of the resulting total normal vector does not grow, the normal vector is flipped 180 degrees (negated) and then added so that the total normal vector magnitude will grow. In FIG. 5A, "B," five normal vectors 43 (from the polygon 40a that is scan converted into five imaginary voxels 42a) are added in their original direction because adding them in the original direction will result in the total normal vector to grow. On the other hand, adding three normal vectors 44 from the polygon 40b in their original direction 44a will result in the total normal vector to shrink into a vector 45a. Thus, these three normal vectors 44 are flipped 180 degrees into 44b, and then added, to render the total normal vector to grow into a vector 45b. The total normal vector 45b is thereafter normalized into a final normal 46, which is then stored as the normal for the actual voxel corresponding to the imaginary voxel grid 24.

Figure 5B:
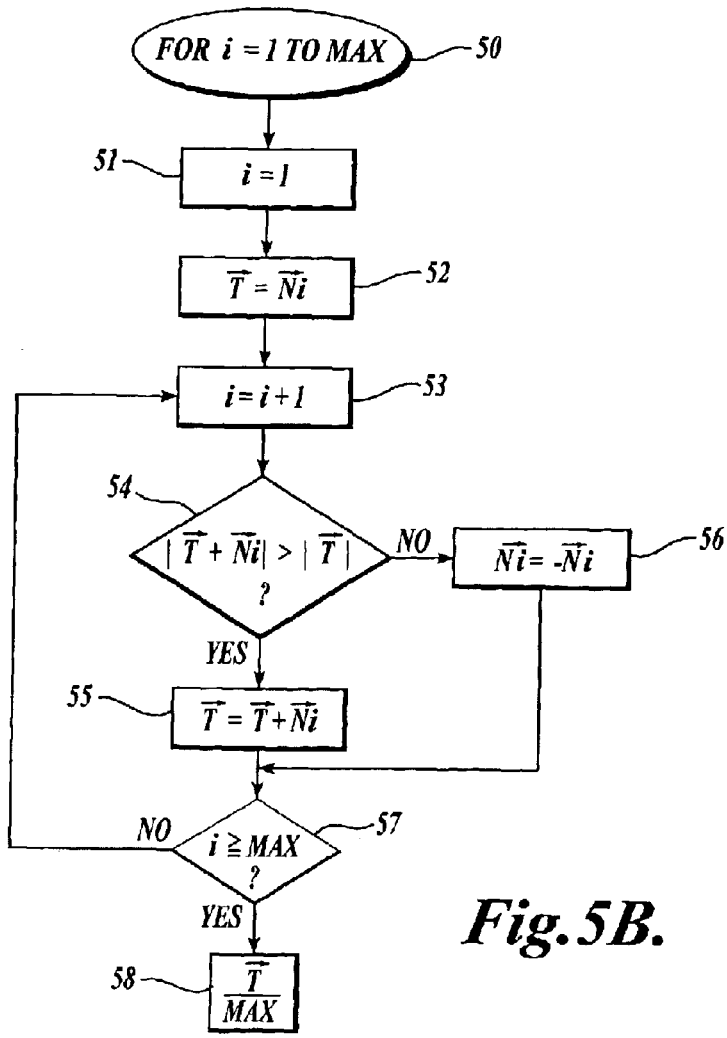
FIG. 5B is a flowchart illustrating the steps used in the method of averaging normals described in FIG. 5A.

FIG. 5B is a flowchart illustrating the steps used in the method of averaging normals, as described above in reference to FIG. 5A. In step 50, a counter "i" is set to represent the number of normal vectors to be added (1 to Max.). In step 51, "i" is initially set at 1. In step 52, the total normal vector is set as the first normal vector. In step 53, "i" is incremented, and in step 54, it is determined whether adding the next normal vector to the total vector will result in the magnitude growth of the total vector. If so, in step 55, the normal vector is added to the total vector to generate a new total vector. If not, in step 56, the normal vector to be added is flipped by 180 degrees (negated), and then in step 55, the flipped normal vector is added to the total vector to generate a new total vector. In step 57, it is determined whether the counter "i" has reached its maximum value. If not, returning to step 53, the counter "i" is incremented to process the next normal vector. When the counter "i" has reached its maximum value, in step 58, the total normal value is normalized to arrive at the actual voxel's final normal value.

The above described method of averaging normals is preferable because it is advantageous to be able to generate bidirectional normals (as used in NGRAIN™) which will summarize information from uni-directional normals. In one case, if the uni-directional normals were averaged as is, the averaged normal can end up pointing in a direction that is nowhere close to the vertex normals. In another case, a preferred direction is needed because the voxel normal may be flipped during rendering so that its voxel normal faces the camera view, and thus a non-conflicting (i.e. in opposite directions) voxel normal direction is needed to make sure that it can be seen. In the case of b-spline surfaces, vertex normals are not available. However, an exact normal at any point on a b-spline surface can be derived using any suitable techniques known to those skilled in the art. This normal can be used for each normal entry per imaginary voxel, and the averaging process as described above can be applied naturally.

Replacing Texture Map (and Other Maps)

Polygon-based 3D data may include associated texture maps. It is well known in the art that texture mapping adds realism in 3D graphics by attaching images (i.e., texture maps) to geometric surfaces. One of the disadvantages of polygon-based 3D data is that applying texture to a polygon mesh model requires constant interpolation of texture map coordinates at polygon vertices and lookup for the interpolated coordinates in the texture map in order to obtain the final color value for each display pixel upon image rendering. This significantly increases computational loads during image rendering, and also means that a RAM intensive texture map needs to be always made available to the polygon mesh model (e.g., whenever a polygon mesh model is rendered, the texture map associated with it needs to be available.)

In accordance with the present invention, when converting polygon-based 3D data into voxels, a texture map associated with the polygon-based 3D data may be "encoded" into the color values of the voxels so that the color values of the voxels effectively represent and replace the texture map. This is a significant advantage because it eliminates the need to carry a texture map around in association with voxel data, let alone the need for constant interpolation and lookup of a texture map during image rendering.

Figure 6A:
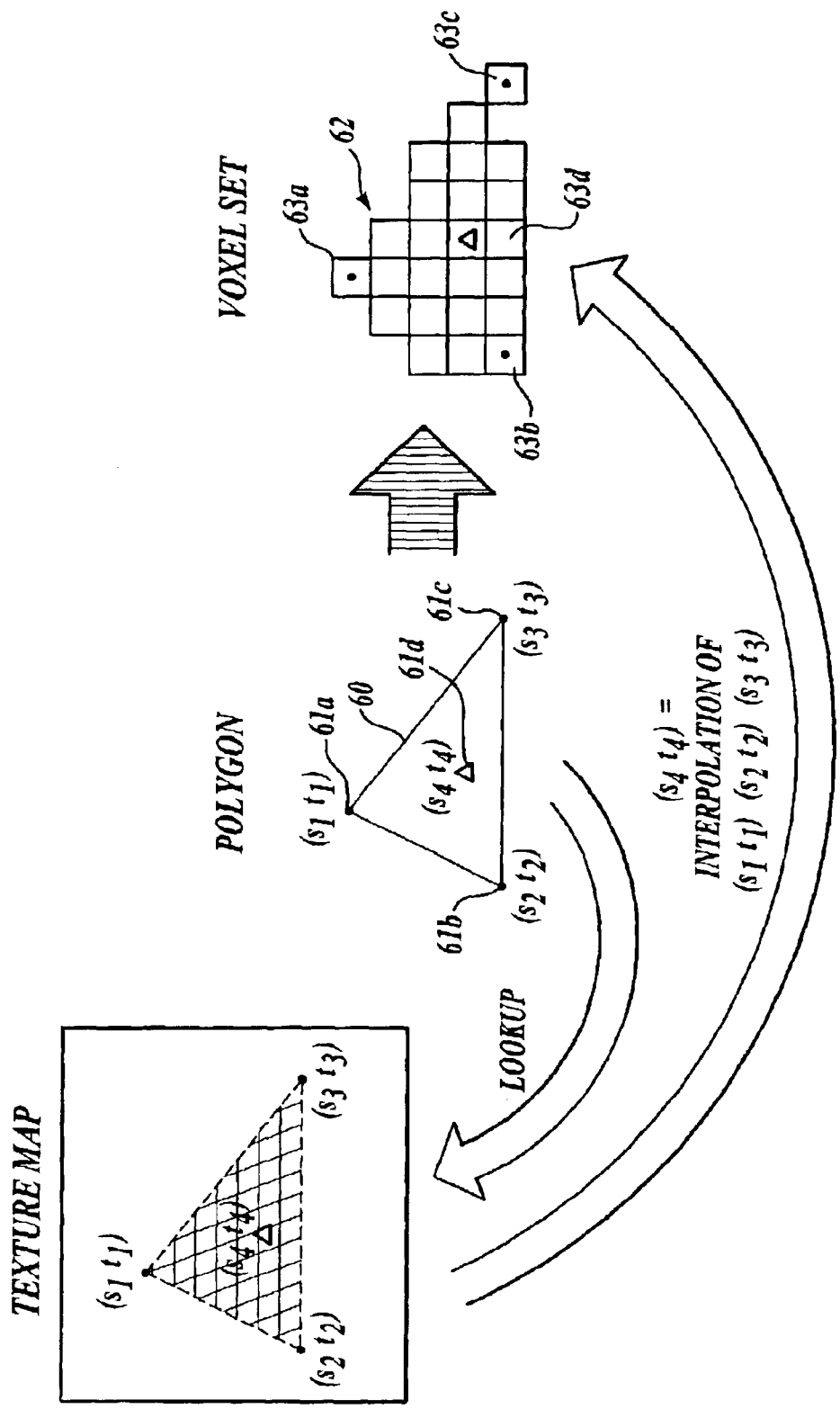
FIG. 6A schematically illustrates a method of replacing a texture map with voxel data according to the present invention.

FIG. 6A schematically illustrates this process. As before, for ease of illustration, FIG. 6A illustrates a polygon and voxels in 2D, although they are actually 3D objects as will be apparent to those skilled in the art. A polygon 60 is defined by its three vertices 61a, 61b, and 61c. The polygon 60 is geometrically converted into a voxel set 62 including a plurality of voxels. A texture map 64 associated with the polygon 60 is "encoded" into the color values of the voxels in the voxel set 62. Specifically, with respect to polygon vertices 61a, 61b, and 61c, the texture map 64 is looked up to obtain the color values at coordinates $(s_1, t_1)$, $(s_2, t_2)$, and $(s_3, t_3)$, respectively, and these color values are imported into corresponding voxels 63a, 63b, and 63c, respectively. With respect to any sample point not residing on the vertices, such as 61d $(s_4, t_4)$ in the polygon 60, the vertex texture coordinates $(s_1, t_1)$, $(s_2, t_2)$, and $(s_3, t_3)$ are interpolated (typically using bilinear interpolation, but bicubic or any other interpolation techniques can be used) to produce a new texture map coordinate $(s_4, t_4)$. Then, the texture map 64 is looked up for this interpolated coordinate $(s_4, t_4)$, and the color is then associated with the corresponding voxel 63d. As a result, the voxels in the voxel set 62 will have color values that effectively represent and replace the texture map 64.

Note that this method may be used in conjunction with the sampling method described above. Using the sampling method of the present invention, color values for high-resolution imaginary voxels are calculated by first interpolating the texture coordinates (s, t) for the imaginary voxels, and then looking up the texture map 64 at those interpolated coordinates. Then, these color values for the high-resolution imaginary voxels are averaged to produce a weighted-average color value for the actual voxel. The end result is that the color values of the actual voxels effectively represent and replace the texture map 64.

The present method may be used to "encode" (i.e., to represent and replace) other attribute maps used in 3D graphics to add more realism to rendered images. For example, a bump map that is used to provide information about the imaginary height of an image, by adding "bumps" on top of an otherwise flat surface, can be also encoded into the normal values of voxels, in the same manner as how the texture map is encoded into the color values of voxels. As further examples, a radiosity (diffuse global illumination) map, transparency map, and reflection map may also be encoded into various attribute values (color values, intensity values, etc.) of voxels, as will be appreciated by those skilled in the art. When encoding an attribute map, "attribute coordinates" of a polygon are interpolated to obtain an interpolated attribute coordinate and then the interpolated attribute coordinate is looked up in the corresponding attribute map to obtain the attribute value for the voxel in question. As used in the present application, the term "attribute coordinates" simply mean the (s, t) coordinates used for the attribute interpolation purpose. Thus, according to the present invention, voxel data may be "encoded" with any type of attribute map (texture map, bump map, radiosity map, transparency map, reflection map, etc.) to add further realism to rendered images.

Figure 6B:
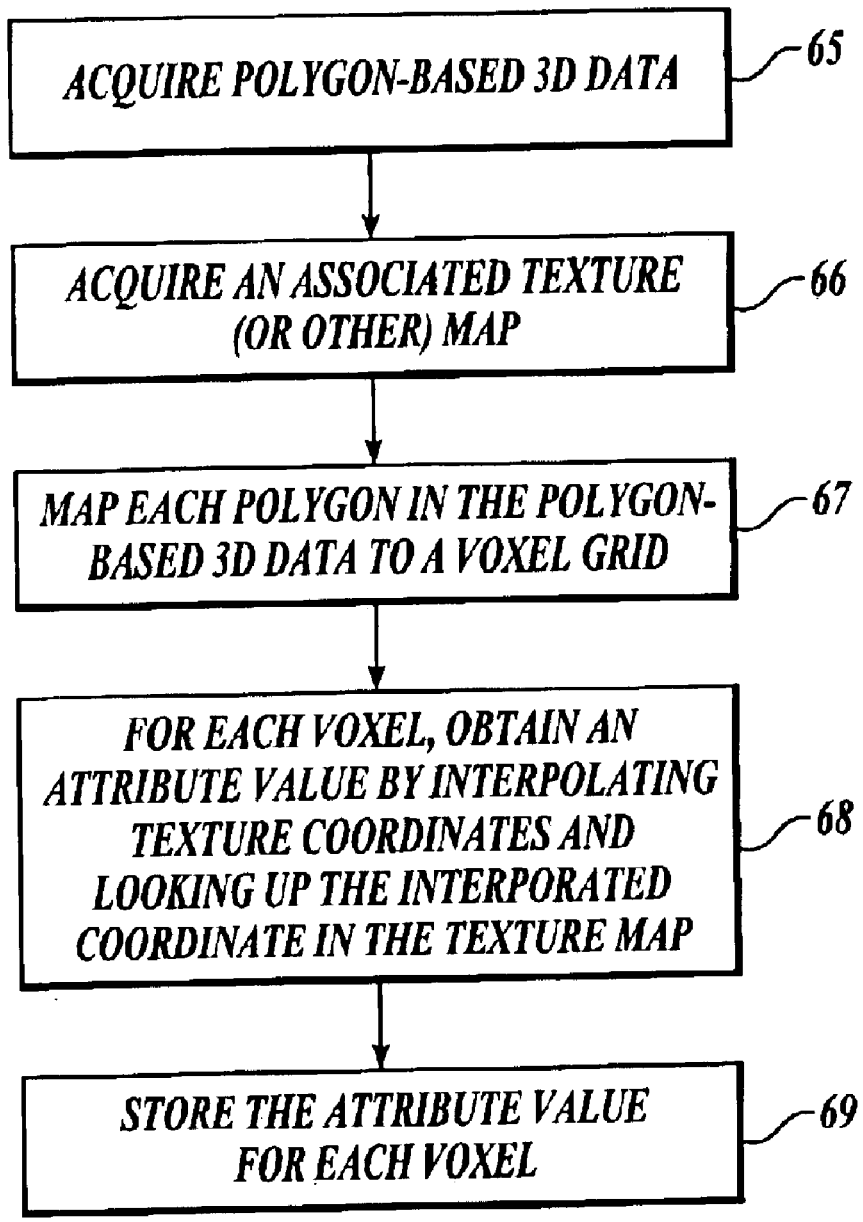
FIG. 6B is a flowchart illustrating the steps used in the method of replacing a texture map with voxel data, described in reference to FIG. 6A.

FIG. 6B is a flowchart illustrating the steps used in the method of "encoding" a texture map (or any other attribute map) into voxels during the polygon-to-voxel conversion, described above. In step 65, polygon-based 3D data are acquired. In step 66, a texture map (or any other attribute map) associated with the polygon-based 3D data is acquired. In step 67, each polygon in the polygon-based 3D data is mapped to a voxel grid. In step 68, for each voxel in the voxel grid mapped from the polygon, an attribute value (for example, a color value when encoding a texture map) is obtained by interpolating the texture (or attribute) coordinates, followed by looking up the attribute value of the interpolated point in the texture map (or any other attribute map). Lastly, in step 69, the attribute value thus obtained for each voxel is stored. As a result, the attribute values of the voxels in a voxel set collectively represent and replace the attribute map.

A special note needs to be made with respect to this aspect of the invention as pertaining to b-spline surfaces. Because b-spline surfaces are parametric in nature, its surface description comes with (s, t) coordinates about its control points to describe its own shape, but which can be used as texture coordinates as well. So the interpolation of such (s, t) values in the context of this aspect of the invention comes from control points, instead of vertices as in polygons. Exact (s, t) values can also be derived per point on the b-spline surface, though interpolation would likely be faster (though approximate).

Complexity Decimation (Reduction)

Figure 7A:
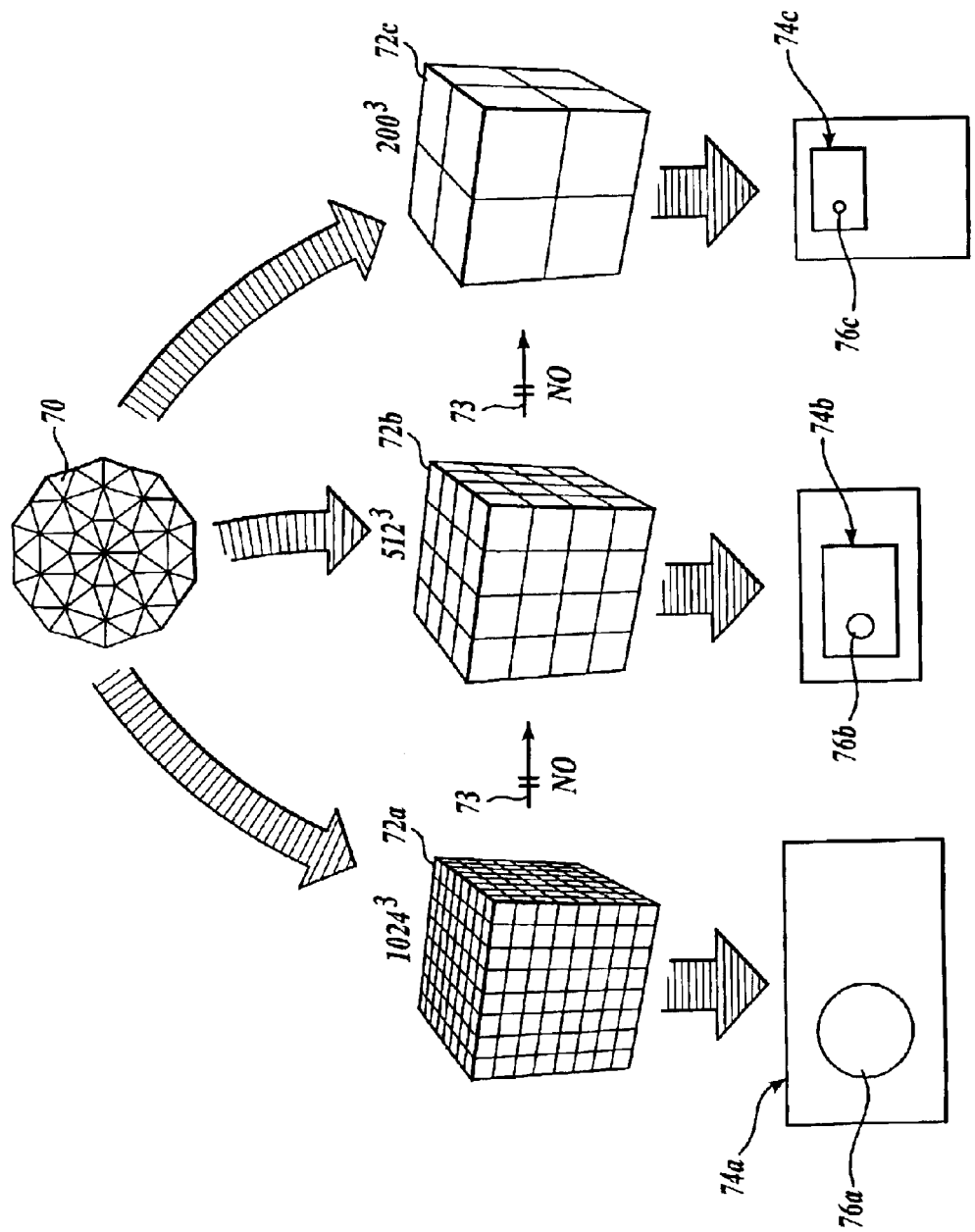
FIG. 7A schematically illustrates the method of "complexity decimation," i.e., progressive reduction in data complexity during the polygon-to-voxel conversion, according to the present invention.

One of the significant advantages in converting polygon-based 3D data to voxels, in accordance with the present invention, is that complexity associated with polygon data can be decimated, i.e., progressively reduced, to any desired low-complexity level during the conversion process. Referring to FIG. 7A, a polygon mesh object 70 is formed of numerous tiny polygons of different shapes, sizes, and relative orientation. The details (complexity) of the polygon mesh object 70 may be required when the object 70 is rendered on a high-resolution display, but are not required when the object 70 is rendered on a low-resolution display. Reducing the complexity of the polygon mesh object 70 for a low-resolution display, however, is an extremely difficult task, particularly in approximating curves, due to the irregularity inherent in the polygon mesh structure consisting of polygons of various shapes, sizes, and relative orientation.

According to the present invention, polygon-based 3D data may be converted to a voxel set of varying resolution in a reliable manner. For example, still referring to FIG. 7A, the polygon mesh object 70 can be converted to voxels in a voxel grid 72a having $1024^3$ resolution, to voxels in a voxel grid 72b having $512^3$ resolution, or to voxels in a voxel grid 72c having $200^3$ resolution. These voxel sets are respectively suited for rendering a high-quality image on a high-resolution display 74a (of a standard PC using the entire window display, for example), a medium-resolution display 74b (of a standard PC using a region less than the entire window display, for example), and a low-resolution display 74c (of a PDA, for example). The displays 74a, 74b, and 74c respectively render images 76a, 76b, and 76c, which are identical images but differ in size. Clearly, the small image 76c on the low-resolution display 74c can be of low resolution and yet be of high enough quality for its display, while the large image 76a on the high-resolution display 74a needs to be in high resolution to be of high enough quality for its display.

Figure 7B:
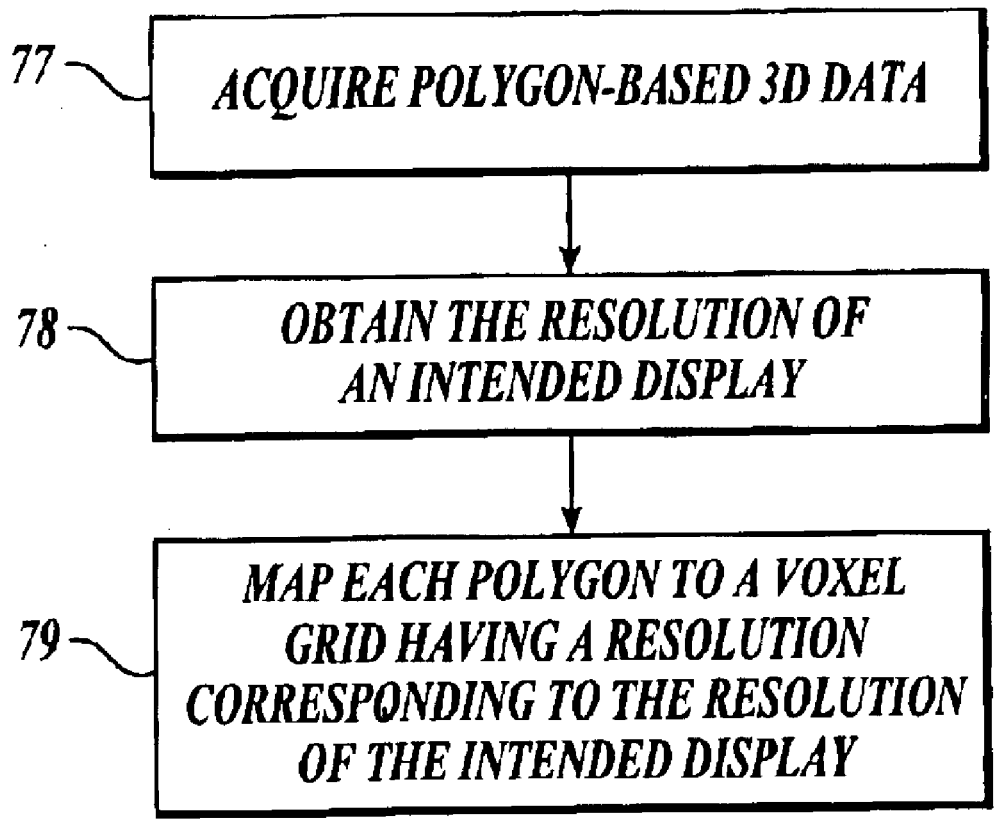
FIG. 7B is a flowchart illustrating the steps used in the method of complexity decimation, described in reference to FIG. 7A.

Reliable complexity decimation is possible in the polygon-to-voxel conversion due to the data structure of voxels. Because all voxels are equally shaped, sized, and evenly spaced from each other, progressive reduction of complexity can be achieved by adjusting the resolution of a final voxel grid into which the polygon data are to be translated. Referring additionally to FIG. 7B, the method of complexity decimation during the polygon-to-voxel conversion includes generally three steps. First, in step 77, polygon-based 3D data are acquired. In step 78, the resolution of an intended display is obtained. Then, in step 79, each polygon is mapped to a voxel grid having a resolution corresponding to the resolution of the intended display. When an intended display has a low resolution, a correspondingly low-resolution voxel grid is used, into which the polygon data are transferred. When an intended display has a high resolution, a correspondingly high-resolution voxel grid is used, into which the polygon data are transferred. Note that converting high-resolution voxel data to low-resolution voxel data, as indicated by arrows 73 in FIG. 7A, is possible (e.g., by selecting every second voxel in each axis) but not desirable because information contained in the original polygon mesh object 70 may be lost during such conversion. Rather, the original polygon mesh object 70 should be used as base data when converting them into voxel data of any desired low-complexity level.

As briefly discussed above, preferably, the resolution of a voxel grid is set at 0.5 to 2 of the resolution of an intended display device. For example, if an intended display has a resolution of 640×480, the voxel grid resolution should be set at any voxel resolution between $320^3$ to $1280^3$.

In the context of b-spline surfaces, complexity decimation plays a different role. The b-spline surface description is quite compact. However, most often, tessellation of b-spline surfaces in polygons is done because of the computational expense of direct rendering of b-spline surfaces. By converting b-spline to voxels, one may bypass the need for the tessellation totally and allow for fast rendering of the b-spline surfaces, in voxel form.

Repairing or Generating Normals

The sampling method and the method of averaging normals, as described above, should produce a valid normal for each voxel. Sometimes, however, the resulting normals may be defective or invalid, as can be visually determined by a user observing the effect of applied lighting to the rendered object Also, on rare occasions, the original polygon data may not include normal data, from which the normals for voxels can be calculated. Therefore, a need exists for a method of generating normal vectors for a voxel set based only on occupancy data (i.e., where voxels are located), without having to use the normal data of the original polygon data.

Figure 8:
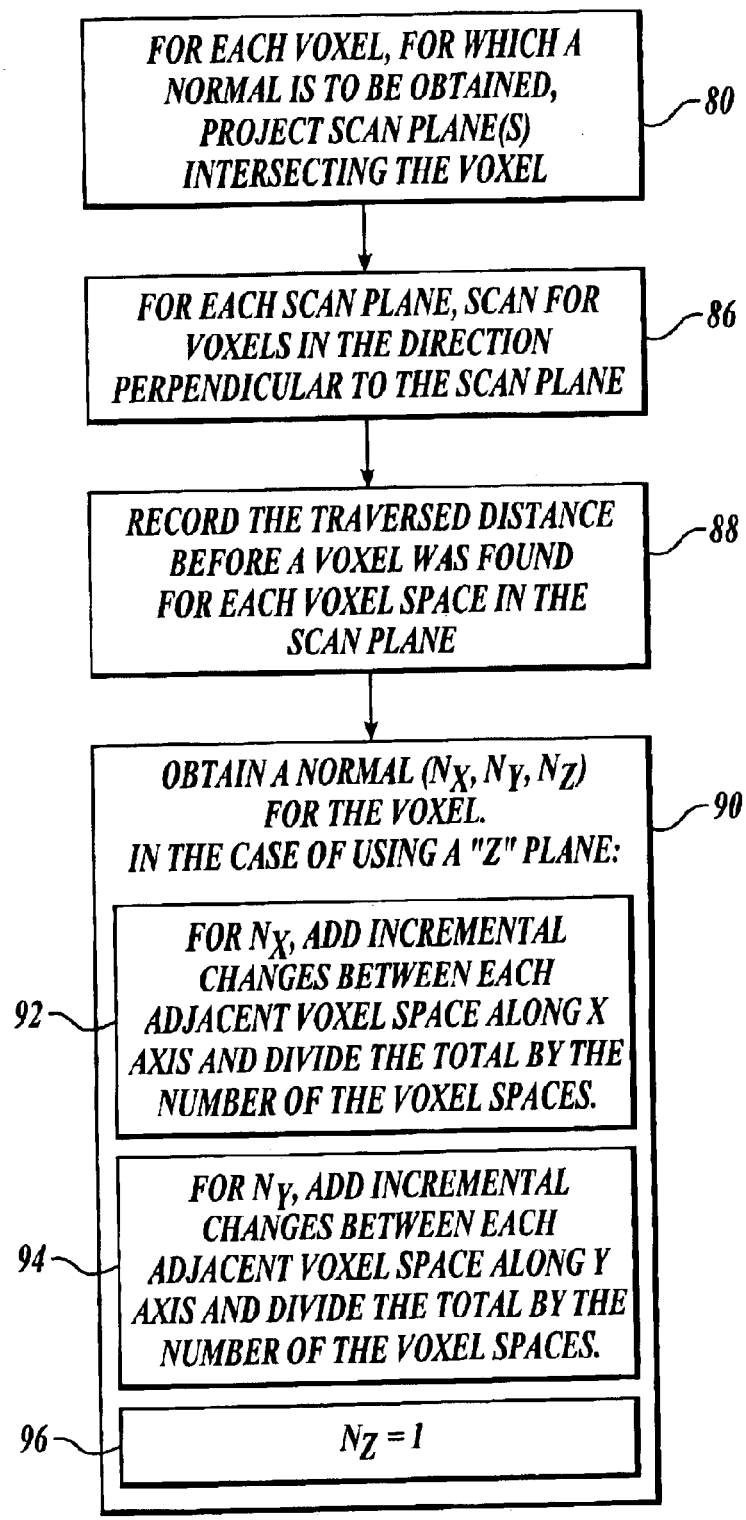
FIG. 8 is a flowchart illustrating the steps used in a method of generating a normal based only on voxel occupancy data, according to the present invention.
Figure 9:
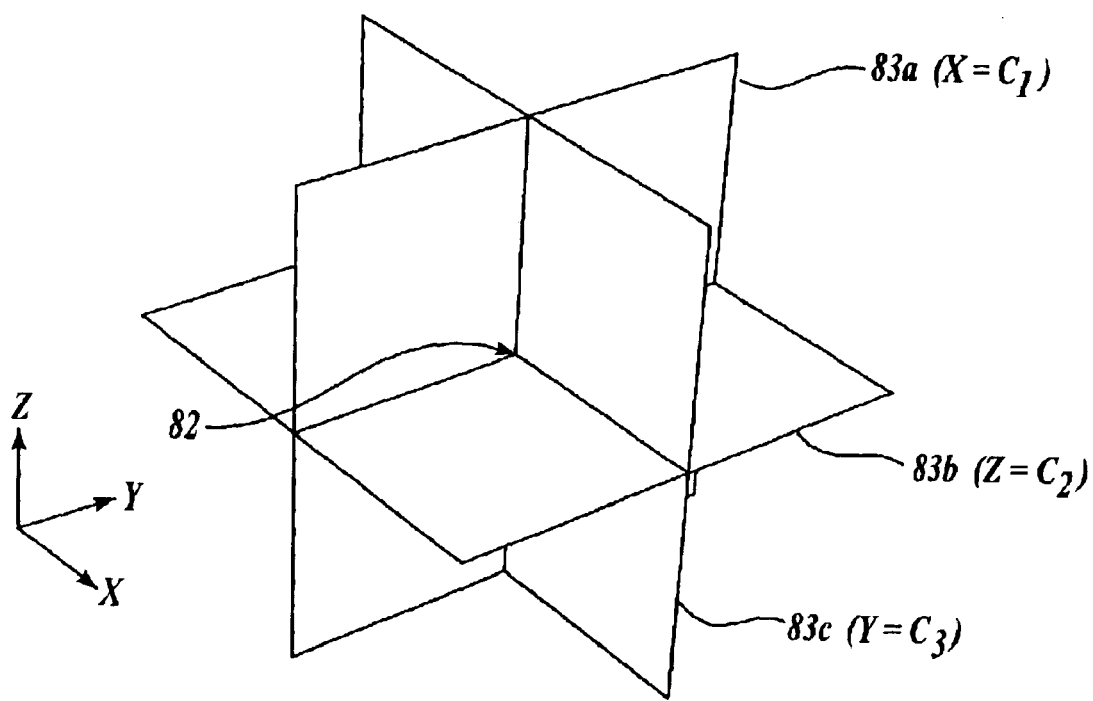
FIG. 9 is a schematic representation of three scan planes, each intersecting a voxel for which a normal is to be calculated, used in the method of FIG. 8.
Figure 10B:
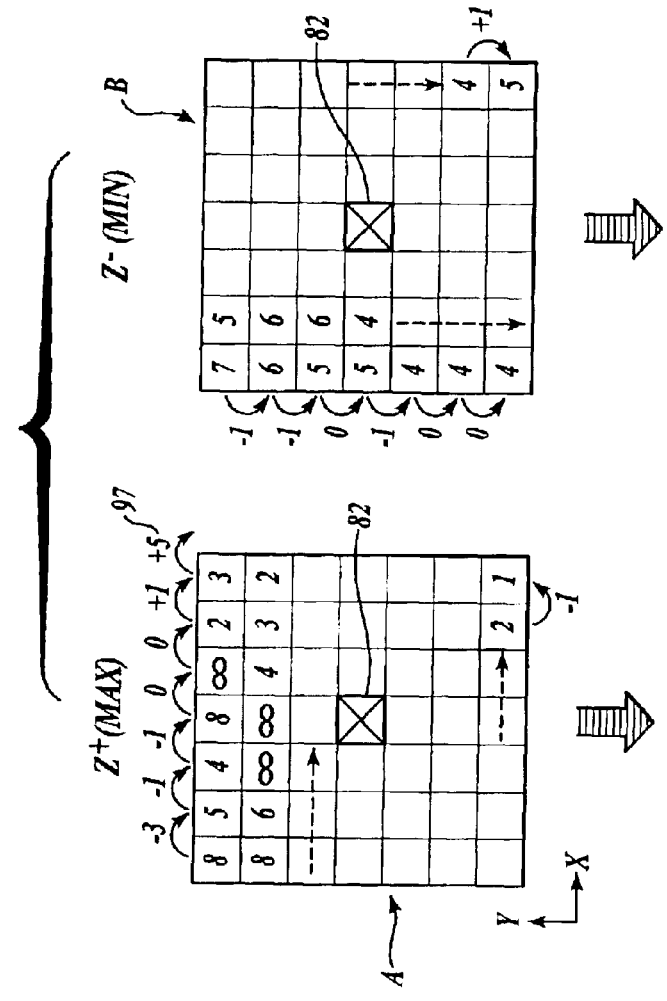
FIG. 10B is a schematic representation of data sets collected from the scanning of FIG. 10A.
Figure 10A:
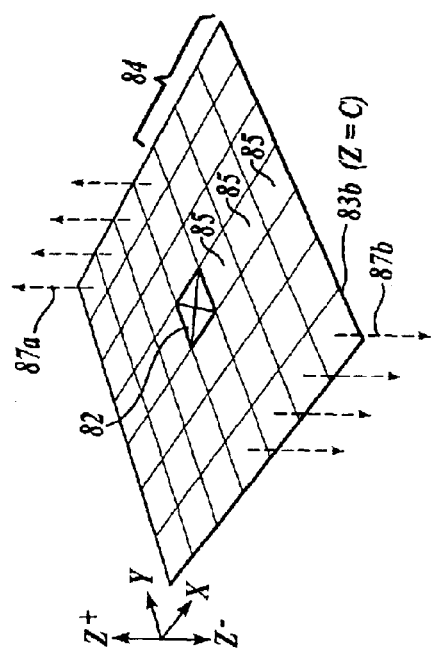
FIG. 10A is a schematic representation of a scan plane, used to scan for voxels in both positive and negative directions, used in the method of FIG. 8.

FIG. 8 is a flowchart illustrating the steps used in a method of generating normals for voxels based only on occupancy data. In step 80, referring additionally to FIG. 9, for a voxel 82 for which a normal is to be obtained, one or more scan planes 83a–83c are projected, each of which intersects the voxel 82. In the illustrated embodiment, three scan planes 83a–83c are projected along the x, y, and z axes, though the scan planes need not be axis aligned. The scan planes 83a, 83b, and 83c are defined as x=C1 (constant), z=C2 (constant), and y=C3 (constant), respectively and each plane intersects the voxel 82, for which the normal is to be obtained. Referring additionally to FIG. 10A, the size of each scan plane is defined by a "gradient radius of influence" 84. The gradient radius of influence is the number of voxel spaces 85 between the central voxel space containing the voxel 82, for which a normal is to be obtained, and the edge of the scan plane. The gradient radius of influence can be defined by a user, and should be set between 3 to 5, typically at 3, though other gradient radius of influence values can also be used depending on each application. The greater the gradient radius of influence, the higher the expected quality of the resultant computed normal, as will be appreciated by those skilled in the art based on the further description of the present method below.

Referring back to FIG. 8, in step 86, for each scan plane, the space is scanned in the direction perpendicular to the scan plane until an occupied voxel is found per each voxel space 85. Referring to FIG. 10A, in the illustrated embodiment, the scan plane 83b is a "z" plane, and the space is scanned in both the positive ($z^+$) and negative ($z^-$) directions, as indicated by arrows 87a and 87b, respectively, though scanning may be performed in one direction only. Then, in step 88 (FIG. 8), the traversed distance before an occupied voxel was found for each voxel space 85 in the scan plane is recorded. Referring additionally to FIG. 10B, "A" represents the result of the scan in the "z" positive direction, while "B" represents the result of the scan in the "z" negative direction, in the illustrated embodiment. In "A," from the top left to the bottom right, in the left-to-right direction, each voxel space is filled with a number (8, 5, 4, 3, ∞, 2, 3, 8, 6, ∞, 8, 4, 3, 2, . . . 2, 1), indicating the traversed distance (i.e., the number of voxel spaces) of the scan per voxel space before a voxel was found. "∞" indicates that no occupied voxel was found in the scan for the voxel space. In "B," from the top left to the bottom right, in the top-to-bottom direction, each voxel space is filled with a number (7, 6, 5, 5, 4, 4, 4, 5, 6, 6, 4, . . . 4, 5), again indicating the traversed distance of the scan per voxel space before an occupied voxel was found. In the illustrated embodiment, where three scan planes 83a, 83b, and 83c are used to each scan in both positive and negative directions, six sets of data, as represented in data set "A" or data set "B" of FIG. 10B, are obtained.

Next, in step 90 (FIG. 8), a normal for the voxel 82 in question is calculated. This step involves three sub-steps 92, 94, and 96 for calculating the x component, y component, and z component of the resulting normal, respectively. First, to calculate the x component of the normal (sub-step 92), still referring to FIG. 10B, for the "z" plane that is scanned in the positive direction ("A"), incremental changes between each adjacent voxel space along the x axis (i.e., in the left-to-right direction in FIG. 10B "A") are added. In the illustrated example, −3 (=5−8), −1 (=4−5), −1 (=3−4), 0 (=∞−3), 0 (=2−∞), 1 (=3−2), 5 (=8−3), . . . and −1 (=1−2) are added together. Whenever ∞ is encountered, the incremental change to or from ∞ is set as 0. Then, the added total of the incremental changes in the x direction (Δx) is divided by the number of voxel spaces 85, to produce the x component of the normal Nx, according to the following equation:

$$Nx = \Delta x / \text{number of voxel spaces}$$

In sub-step 94 (FIG. 8), the y component of the normal is calculated in a similar manner, but this time by adding up the incremental changes between each adjacent voxel space along the y axis (i.e., as in the top-to-bottom direction in FIG. 10B "A") and by dividing the added total by the number of voxel spaces, according to the following equation:

$$Ny = \Delta y / \text{number of voxel spaces}$$

Finally, in sub-step 96 (FIG. 8), the z component of the normal Nz is simply set as 1. Since no scans were made along vectors contained by the z plane, we need to create an estimate of z plane contribution to the normal. The two extreme cases are that the z-plane has 0 contribution because the correct normal points along a line perpendicular to the z plane, and that the z-plane has infinite contribution because the correct normal points along the z plane. A case between the two extreme cases is that the correct normal points 45 degrees from both a vector perpendicular to the z plane and a vector on the z plane. In this case, the change from a scan would have Δz for each voxel transition equal to 1 since a 45 degree slope has rise/run equal to 1/1.

$$Nz = \Delta z / \text{number of voxel spaces} = 1.$$

Accordingly, a normal (Nx, Ny, Nz) was obtained based on the "z" plane scanned in the positive direction, using the recorded data "A" of FIG. 10B. A normal can be calculated in a similar manner based on the "z" plane scanned in the negative direction, using the recorded data "B" of FIG. 10B. Note that FIG. 10B specifically illustrates the addition of incremental changes along the y axis to obtain Ny. Further, a normal can be calculated in a similar manner based on the "x" or "y" plane, scanned in both positive and negative directions. As a result, in the illustrated embodiment, six normals are calculated based on the three scan planes 83a–83c, each scanned in both positive and negative directions.

In one embodiment of the present invention, when plural normals are calculated as described above, one normal is selected based on the least "discontinuous criteria" of the particular scan plane. Specifically, referring back to FIG. 10B, for each data set obtained (e.g., data set "A" or "B"), the number of discontinuities is counted for each of the two axes of iteration. A discontinuity is defined as a change between adjacent voxel spaces that is greater in magnitude than some constant, where a good value for the constant is the gradient radius of influence. In the illustrated embodiment, the gradient radius of influence is set as 3, so a discontinuity is counted each time a change greater than 3 in magnitude occurs. In data set "A," the change of +5, from 3 to 8, as noted by reference number 97, is thus counted as one discontinuity. The total number of discontinuities iterated along the x axis is combined with the total number of discontinuities iterated along the y axis. The grand total of discontinuities is the number of discontinuities for this data set. Accordingly, in the illustrated embodiment, each of the six normals (obtained from three scan planes, each scanned in positive and negative directions) is associated with a particular number of discontinuities. Of the six normals, one normal associated with the smallest number of discontinuities may be selected as the most reliable normal for the voxel in question.

In another embodiment of the present invention, when plural normals are calculated, they can be averaged using any suitable techniques apparent to those skilled in the art to produce one normal for the voxel in question. In a particular embodiment, normal contributions from scan planes are averaged together, where the vector component, which could not be determined from a scan plane because of the direction of scanning, is ignored. For example, for a z-plane scan plane, as discussed in the illustrated embodiment above, the z direction is not scanned in, therefore the z vector component cannot be determined. Thus, the z-plane would contribute only x and y component values to the final computed normal. Therefore for 6 axis-aligned scan planes, each vector component could be the result of adding 4 vector components from 4 of the 6 scan planes, where the contributions from the 2 scan planes lying along the normal component direction, are ignored.

It is also possible to use only one scan plane and to scan in one direction only (positive or negative) so as to produce only one data set, from which one normal can be obtained for the voxel in question. In this case, no averaging or selection among plural normals is necessary.

The above method can be repeated for each voxel, for which a normal is to be generated.

FIG. 11 is a pictorial diagram illustrating the concept behind the normal generation method described above. Scanning for occupied voxels and observing the change in the found voxels' positions along the x direction, y direction, and z direction, in effect, suggests a pattern of behavior of the surface region surrounding the voxel 82, for which a normal is to be calculated. A normal for the voxel is thus generated to conform with the suggested pattern of behavior of the region. A normal associated with the smallest number of discontinuities is deemed most reliable because, in general, the less number of discontinuities, the more continuous the found surface region surrounding the voxel.

The normals thus generated may be used when no normal data are provided with the particular polygon-based 3D data that are to be converted to voxel data. Also, the normals thus generated may replace "bad" normals obtained using the averaging method described above, to in effect "repair" such bad normals.

FIG. 12 depicts several of the key components of a computing device 200 which may be used to transform polygon data to volumetric data Those skilled in the art will appreciate that the computing device 200 may include many more components than those shown in FIG. 12. However, it is not necessary that all of these generally conventional components be shown in order to disclose an enabling embodiment for practicing the invention. As shown in FIG. 12, the computing device 200 includes an input/output ("I/O") interface 130 for connecting to other 3D data collection devices. Those skilled in the art will appreciate that the I/O interface 130 includes the necessary circuitry for such a connection, and is also constructed for use with the necessary protocols.

The computing device 200 also includes a processing unit 110, a display 140, and a memory 150 all interconnected along with the I/O interface 130 via a bus 120. The memory 150 generally comprises a random access memory ("RAM"), a read-only memory ("ROM"), and a permanent mass storage device, such as a disk drive, tape drive, optical drive, floppy disk drive, or combination thereof. The memory 150 stores an operating system 265, a conversion function (transformation routine) 300 for transforming polygon data to voxel data and a database 310 for storing the raw polygon data that will be transformed by the present invention into voxel data. In other embodiments of the present invention, memory 150 may also store programs and routines appropriate for rendering 3D images based on the voxel data generated by the conversion function 300. It will be appreciated that the software components described above may be loaded from a computer-readable medium into memory 150 of the computing device 200 using a drive mechanism (not shown) associated with the computer readable medium, such as a floppy, tape or DVD/CD-ROM drive, or via the I/O interface 130.

Although an exemplary computing device 200 has been described that generally conforms to a conventional general purpose computing device, those skilled in the art will appreciate that a computing device 200 may be of any of a great number of devices capable of transforming polygon data to volumetric data. However, in an preferred embodiment of the present invention, the computing device 200 does not require specialized hardware or a significantly large amount of memory as the computing device 200 requires only 512 megabytes of RAM and a 700 megahertz Intel® Pentium®III or an equivalent thereof.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An efficient method of transforming scan-convertible 3D geometric data to voxel data, comprising the steps of:
   acquiring 3D geometric data;
   obtaining the resolution of a final voxel grid to be produced;
   mapping each geometric unit in the 3D geometric data to an imaginary voxel grid having a higher resolution than the resolution of the final voxel grid;
   with respect to the geometric units that are mapped to the imaginary voxels in the imaginary voxel grid corresponding to a final voxel in the final voxel grid, obtaining a weighted average of the attribute values of those geometric units with respect to the imaginary voxels; and
   storing the weighted average as the attribute value of the final voxel.

2. The method of claim 1, wherein the attribute value is selected from the group consisting of color, intensity, and normal values.

3. The method of claim 1, wherein the attribute value is selected from the group consisting of temperature, density, mass, tensile strength, and flammability values.

4. The method of claim 1, wherein plural types of attribute values are calculated for each final voxel, and each type of attribute values is stored separately.

5. The method of claim 1, wherein the 3D geometric data comprise polygonal data, and the geometric unit comprises a polygon.

6. The method of claim 1, wherein the 3D geometric data comprise b-spline surface data, constructive solid geometry (CSG) data, or subdivision surfaces data.

7. The method of claim 1, wherein the attribute value is a normal value, and a weighted average of the normal values of the geometric units mapped to the imaginary voxels is obtained by adding each normal value to a total normal value so that each addition will cause the magnitude of the total normal value to grow.

8. The method of claim 7, wherein the addition of a normal value to the total normal value will cause the magnitude of the total normal value to grow by changing the direction of the normal value by 180 degrees.

9. A computer-readable medium or signal having computer-executable instructions for performing the method in any one of claims 1–8.

10. An apparatus for transforming 3D geometric data to voxel data, comprising an input/output interface, display, memory, and processor with hardware and software components for performing the method in any one of claims 1–8.

11. A method of transforming surface-based 3D data to voxel data, comprising the steps of:
 (a) acquiring surface-based 3D data;
 (b) acquiring a texture map associated with the surface-based 3D data;
 (c) mapping each surface unit in the surface-based 3D data to a voxel grid;
 (d) for each voxel in the voxel grid mapped from the surface unit, obtaining a color value by interpolating the surface unit's texture coordinates and then performing a lookup of the interpolated coordinate in the texture map; and
 (e) storing the obtained color value for each voxel, wherein the color value represents and replaces the texture map.

12. The method of claim 11, wherein the step (c) of mapping each surface unit in the surface-based 3D data to a voxel grid comprises:
 (i) obtaining the resolution of a final voxel grid to be produced; and
 (ii) mapping each surface unit in the surface-based 3D data to an imaginary voxel grid having a higher resolution than the resolution of the final voxel grid; and
 wherein the step (d) of obtaining a color value for each voxel in the voxel grid comprises:
 (iii) with respect to the surface units that are mapped to the imaginary voxels in the imaginary voxel grid corresponding to the final voxel in the final voxel grid, obtaining a color value for each imaginary voxel by interpolating the surface unit's texture coordinates and then performing a lookup of the interpolated coordinate in the texture map; and
 (iv) obtaining a weighted average of the color values of those surface units with respect to the imaginary voxels.

13. The method of claim 11, wherein the surface-based 3D data comprise polygonal data, and the surface unit comprises a polygon.

14. The method of claim 11, wherein the surface-based 3D data comprise b-spline surface data or subdivision surfaces data.

15. A computer-readable medium or signal having computer-executable instructions for performing the method in any one of claims 11–14.

16. An apparatus for transforming surface-based 3D data to voxel data, comprising an input/output interface, display, memory, and processor with hardware and software components for performing the method in any one of claims 11–14.

17. A method of transforming surface-based 3D data to voxel data, comprising the steps of:
 (a) acquiring surface-based 3D data;
 (b) acquiring an attribute map associated with the surface-based 3D data;
 (c) mapping each surface unit in the surface-based 3D data to a voxel grid;
 (d) for each voxel in the voxel grid mapped from the surface unit, obtaining an attribute value by interpolating the surface unit's attribute coordinates and then performing a lookup of the interpolated attribute coordinate in the attribute map; and
 (e) storing the obtained attribute value for each voxel, wherein the attribute value represents and replaces the attribute map.

18. The method of claim 17, wherein the attribute map is selected from the group consisting of a bump map, radiosity map, transparency map, and reflection map.

19. The method of claim 17, wherein the step (c) of mapping each surface unit in the surface-based 3D data to a voxel grid comprises:
 (i) obtaining the resolution of a final voxel grid to be produced; and
 (ii) mapping each surface unit in the surface-based 3D data to an imaginary voxel grid having a higher resolution than the resolution of the final voxel grid; and
 wherein the step (d) of, obtaining an attribute value for each voxel in the voxel grid comprises:
 (iii) with respect to the surface units that are mapped to the imaginary voxels in the imaginary voxel grid corresponding to the final voxel in the final voxel grid, obtaining an attribute value for each imaginary voxel by interpolating the surface unit's attribute coordinates and performing a lookup of the interpolated attribute coordinate in the attribute map; and
 (iv) obtaining a weighted average of the attribute values of those surface units with respect to the imaginary voxels.

20. The method of claim 17, wherein the surface-based 3D data comprise polygonal data, and the surface unit comprises a polygon.

21. The method of claim 17, wherein the surface-based 3D data comprise b-spline surface data or subdivision surfaces data.

22. A computer-readable medium or signal having computer-executable instructions for performing the method in any one of claims 17–21.

23. An apparatus for transforming surface-based 3D data to voxel data, comprising an input/output interface, display, memory, and processor with hardware and software components for performing the method in any one of claims 17–21.

24. A method of transforming surface-based 3D data to voxel data for the purpose of complexity decimation, comprising the steps of:
 acquiring surface-based 3D data;
 obtaining the resolution of an intended display; and mapping each surface unit in the surface-based 3D data to a voxel grid having a resolution corresponding to the resolution of the intended display.

25. The method of claim 24, wherein the voxel grid resolution is set at 0.5 to 2 of the resolution of the intended display.

26. The method of claim 24, wherein the surface-based 3D data comprise polygonal data, and the surface unit comprises a polygon.

27. The method of claim 24, wherein the surface-based 3D data comprise b-spline surface data or subdivision surfaces data.

28. A computer-readable medium or signal having computer-executable instructions for performing the method in any one of claims 24–27.

29. An apparatus for transforming surface-based 3D data to voxel data, comprising an input/output interface, display, memory, and processor with hardware and software components for performing the method in any one of claims 24–27.

30. A method of generating a normal for a voxel in voxel graphics, comprising:
   (a) projecting a scan plane intersecting the voxel, wherein the scan plane is perpendicular to a first axis;
   (b) using the scan plane, scanning for voxels in the direction perpendicular to the scan plane;
   (c) recording the traversed distance before a voxel was found for each voxel space in the scan plane; and
   (d) obtaining a normal ($N_1$, $N_2$, $N_3$), wherein $N_1$ is the first component of the normal along the first axis, $N_2$ is the second component of the normal along the second axis perpendicular to the first axis, and $N_3$ is the third component of the normal perpendicular to both the first and second axes, by:
      (i) setting $N_1$ as 1;
      (ii) obtaining $N_2$ by adding incremental changes between the traversed distances recorded in each adjacent voxel spaces along the second axis and dividing the total incremental changes by the number of voxel spaces; and
      (iii) obtaining $N_3$ by adding incremental changes between the traversed distances recorded in each adjacent voxel spaces along the third axis and dividing the total incremental changes by the number of voxel spaces.

31. The method of claim 30, wherein plural scan planes are projected, and each scan plane is used to obtain a normal separately.

32. The method of claim 30, wherein the scan plane is scanned in both positive and negative directions along the first axis, and each of the positive and negative scanning is used to obtain a normal separately.

33. The method of claim 30, wherein x, y, and z scan planes are projected, and each scan plane is scanned in both positive and negative directions perpendicular to the scan plane, to obtain six suggested normals for the voxel.

34. The method of claim 33, further comprising the steps of:
   counting the number of discontinuities for each data set associated with each of the six normals, wherein a discontinuity is defined as a change between the traversed distances recorded in adjacent voxel spaces that is greater in magnitude than a predefined constant value; and
   selecting one normal associated with the smallest number of discontinuities.

35. The method of claim 34, wherein the predefined constant value is a gradient radius of influence.

36. The method of claim 33, further comprising the step of:
   averaging a set of available normals while ignoring the calculated contributions of a normal direction component from a scan plane where the component's vector lies along the scan plane, to obtain one normal for the voxel.

37. A computer-readable medium or signal having computer-executable instructions for performing the method in any one of claims 30–36.

38. An apparatus comprising an input/output interface, display, memory, and processor with hardware and software components for performing the method in any one of claims 30–36.

* * * * *